United States Patent [19]

Guenther et al.

[11] Patent Number: 5,530,031
[45] Date of Patent: Jun. 25, 1996

[54] WATER-INSOLUBLE MELAMINE-FORMALDEHYDE RESINS

[75] Inventors: Erhard Guenther, Ludwigshafen; Wolfgang Reuther, Heidelberg; Uwe Kirchgässner, Frankenthal, all of Germany

[73] Assignee: BASF Aktiengesellschaft, Ludwigshafen, Germany

[21] Appl. No.: 303,464

[22] Filed: Sep. 9, 1994

[30] Foreign Application Priority Data

Sep. 11, 1993 [DE] Germany .................. 43 30 910.0

[51] Int. Cl.⁶ .................................................. C08J 11/04
[52] U.S. Cl. ..................... 521/495; 528/163; 528/129; 528/230; 528/252; 528/254
[58] Field of Search ..................... 528/163, 129, 528/230, 252, 254; 521/49.5

[56] References Cited

U.S. PATENT DOCUMENTS

| | | | |
|---|---|---|---|
| 4,088,620 | 5/1978 | Nihongi et al. | 428/332 |
| 4,511,678 | 4/1985 | Mahnke et al. | 521/53 |
| 4,996,289 | 2/1991 | Berbner et al. | 528/230 |
| 5,084,488 | 1/1992 | Weiser et al. | 521/187 |
| 5,322,915 | 6/1994 | Weiser et al. | 528/163 |

FOREIGN PATENT DOCUMENTS

| | | |
|---|---|---|
| 19589/92 | 1/1993 | Australia . |
| 2364091 | 7/1976 | European Pat. Off. . |
| 221330 | 1/1991 | European Pat. Off. . |
| 523485 | 1/1993 | European Pat. Off. . |
| 553421 | 8/1993 | European Pat. Off. . |
| 408947 | 3/1994 | European Pat. Off. . |
| 2915457 | 10/1980 | Germany . |

OTHER PUBLICATIONS

Ullmanns Encyclopadie der Tech. Chem., 3rd Ed., vol. 8, p. 389f.
Houben–Weyl, vol. 14/2, 357.

*Primary Examiner*—James J. Seidleck
*Assistant Examiner*—Duc Truong
*Attorney, Agent, or Firm*—Keil & Weinkauf

[57] ABSTRACT

Water-insoluble condensation products, obtained by the condensation of a mixture containing as essential components (A) from 80 to 99.9 mol %, based on the sum of (A), (B) and (C), of a mixture consisting essentially of
  (a) from 30 to 99 mol % of melamine and
  (b) from 1 to 70 mol % of a substituted melamine of the formula I

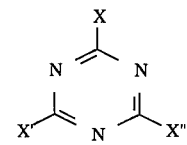

where X, X' and X" are each selected from the group consisting of $-NH_2$, $-NHR$ and $-NRR'$, and X, X' and X" are not all $-NH_2$ at one and the same time, and R and R' are each selected from the group consisting of hydroxy-$C_2$-$C_{10}$-alkyl, hydroxy-$C_2$-$C_4$-alkyl-(oxa-$C_2$-$C_4$-alkyl)$_n$, where n is from 1 to 5, and amino-$C_2$-$C_{12}$-alkyl, or mixtures of melamines I, (B) from 0.1 to 10 mol %, based on the sum of (A), (B) and (C) of a polyurea of the formula II

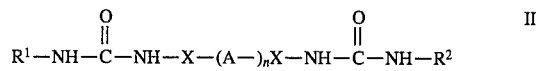

and (C) up to 10 mol %, based on the sum of (A), (B) and (C), of substituted or unsubstituted phenols, with formaldehyde or formaldehyde source compounds in a molar ratio of melamines to formaldehyde within the range of from 1:1.15 to 1:4.5.

9 Claims, No Drawings

WATER-INSOLUBLE MELAMINE-FORMALDEHYDE RESINS

The present invention relates to water-insoluble condensation products obtainable by condensation of a mixture containing as essential components (A) from 80 to 99.9 mol %, based on the sum of (A), (B) and (C), of a mixture consisting essentially of
  (a) from 30 to 99 mol % of melamine and
  (b) from 1 to 70 mol % of a substituted melamine of the general formula I

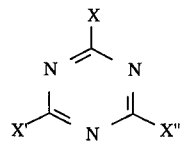

where X, X' and X" are each selected from the group consisting of —$NH_2$, —NHR and —NRR', and X, X' and X" are not all —$NH_2$ at one and the same time, and R and R' are each selected from the group consisting of hydroxy-$C_2$-$C_{10}$-alkyl, hydroxy-$C_2$-$C_4$-alkyl-(oxa-$C_2$-$C_4$-alkyl)$_n$, where n is from 1 to 5, and amino-$C_2$-$C_{12}$-alkyl, or mixtures of melamines I, (B) from 0.1 to 10 mol %, based on the sum of (A), (B) and (C) of a polyurea of the formula II

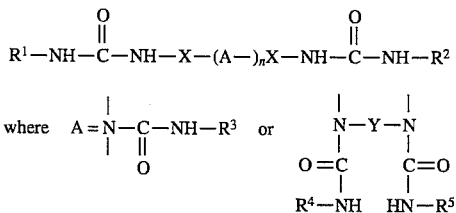

$Y = C_1$-$C_6$-alkylene,
$n = 0$ or 1,
$X = C_1$-$C_6$-alkylene,
$C_5$-$C_6$-cycloalkylene,
$C_1$-$C_6$-hydroxyalkylene or
$C_4$-$C_{18}$-oxyalkylene, and
$R^1$- $R^5$ are each H or $CH_2OH$
and (C) up to 10 mol %, based on the sum of (A), (B) and (C), of phenols which are unsubstituted or substituted by radicals selected from the group consisting of $C_1$-$C_9$-alkyl and hydroxyl, $C_1$-$C_4$-alkanes substituted by two or three phenol groups, di(hydroxyphenyl) sulfones or mixtures of these phenols, with
formaldehyde or formaldehyde source compounds in a molar ratio of melamines to formaldehyde within the range from 1:1.15 to 1:4.5.

The invention further relates to a process for preparing these condensation products, to their use for producing fibers and foams, and to shaped articles obtainable from these products.

EP-A-553 421 describes the use of polyureas as per component (B) in resin solutions for impregnating paper webs.

DE-A-29 15 457, DE-A-23 64 091, EP-A-221 330 and EP-A-408 947 disclose shaped articles such as foams and fibers in melamine-formaldehyde condensation resins in which melamine is wholly or partly replaced by substituted melamines such as hydroxyalkyl-substituted or hydroxyalkyloxaalkyl-substituted melamines.

One disadvantage of the prior art melamine-formaldehyde resins is their inadequate resistance to hydrolysis, which results in the emission of formaldehyde in undesirably high amounts. This is why in EP-A-523 485 it is proposed to carry out the condensation in the presence of phenols which are unsubstituted or substituted by radicals selected from the group consisting of $C_1$-$C_9$-alkyl and hydroxyl, $C_1$-$C_4$-alkanes substituted by two or three phenol groups, di(hydroxyphenyl) sulfones or mixtures of these phenols.

It is an object of the present invention to provide further melamine-formaldehyde condensation products which in the cured state are free of the abovementioned disadvantages.

We have found that this object is achieved by the condensation products defined at the beginning.

We have also found a process for preparing these condensation products, their use for producing fibers and foams, and also shaped articles obtainable from these products.

The melamine resins of the invention contain as component (A) from 80 to 99.9 mol % of a mixture consisting essentially of from 30 to 99, preferably from 50 to 99, particularly preferably from 85 to 95, mol % of melamine and from 1 to 70, preferably from 1 to 50, particularly preferably from 5 to 15, mol % of a substituted melamine I or mixtures of substituted melamines I.

Suitable substituted melamines of the formula I

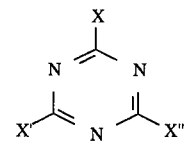

are those in which X, X' and X" are each selected from the group consisting of —$NH_2$, —NHR and —NRR', and X, X' and X" are not all —$NH_2$ at one and the same time, and R and R' are each selected from the group consisting of hydroxy-$C_2$-$C_{10}$-alkyl, hydroxy-$C_2$-$C_4$-alkyl-(oxa-$C_2$-$C_4$-alkyl)$_n$, where n is from 1 to 5, and amino-$C_2$-$C_{12}$-alkyl.

The hydroxy-$C_2$-$C_{10}$-alkyl groups chosen are preferably hydroxy-$C_2$-$C_6$-alkyl such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, 3-hydroxy-2,2-dimethylpropyl, preferably hydroxy-$C_2$-$C_4$-alkyl such as 2-hydroxyethyl, 3-hydroxy-n-propyl, 2-hydroxyisopropyl and 4-hydroxy-n-butyl, particularly preferably 2-hydroxyethyl and 2-hydroxyisopropyl.

The hydroxy-$C_2$-$C_4$-alkyl-(oxa-$C_2$-$C_4$-alkyl)$_n$ groups chosen are preferably those where n is from 1 to 4, particularly preferably those where n is 1 or 2, such as 5-hydroxy-3-oxapentyl, 5-hydroxy-3-oxa-2,5-dimethyl-pentyl, 5-hydroxy-3-oxa-1,4-dimethylpentyl, 5-hydroxy-3-oxa-1,2,4,5-tetramethyl-pentyl, 8-hydroxy-3,6-dioxa-octyl.

Suitable amino-$C_2$-$C_{12}$-alkyl groups are preferably amino-$C_2$-$C_8$-alkyl groups such as 2-aminoethyl, 3-aminopropyl, 4-aminobutyl, 5-aminopentyl, 6-aminohexyl, 7-aminoheptyl and 8-aminooctyl, particularly preferably 2-aminoethyl and 6-aminohexyl, very particularly preferably 6-aminohexyl.

Substituted melamines which are particularly suitable for the invention contain 1 to 3 substituted $NH_2$ groups such as 2-hydroxyethylamino, 2-hydroxyisopropylamino, 5-hydroxy-3-oxapentylamino, 6-aminohexylamino or mixtures of these compounds, for example a mixture of 10 mol-% of a substituted melamine containing a 5-hydroxy-3-oxa-pentylamino group in the 2 position, 50 mol-% of a substituted melamine containing 5-hydroxy-3-oxa-pentylamino groups in the 2 and 4 positions, and 40 mol-% of a substituted melamine containing 5-hydroxy-3-oxa-pentylamino groups in the 2, 4 and 6 positions.

As component (B) the water-insoluble melamine-formaldehyde resins contain from 0.1 to 10 mol % of a polyurea of the formula II

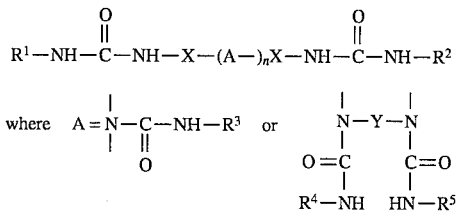

Y=$C_1$-$C_6$-alkylene,
n=0 or 1,
X=$C_1$-$C_6$-alkylene,
  $C_5$-$C_6$-cycloalkylene,
  $C_1$-$C_6$-hydroxyalkylene or
  $C_4$-$C_8$-oxyalkylene, and
$R^1$- $R^5$ are each H or $CH_2OH$.

Polyureas and their preparation are described in Ullmanns Encyclopadie der Technischen Chemie, 3rd Edition, Volume 8, page 389f.

The polyureas of the formula (II) are prepared in aqueous solution. A polyamine having primary or secondary amino groups is reacted at elevated temperature with urea by elimination of ammonia to form the corresponding polyurea.

Suitable polyamines are alkylenediamines, dialkylenetriamines, polyalkylenepolyamines and also functional polyamines, for example ethylenediamine, 1,3-propylenediamine, diethylenetriamine, dipropylenetriamine, triethylenetetramine, hexamethylenediamine, etherdiamines, polyetherdiamines, etc.

To prepare the polyureas the polyamines are reacted with the theoretically required amount, but advantageously with a small excess, of urea, in concentrated aqueous solution at from 80° C. to 120° C. The reaction time is within the range from one hour to 15 hours. The ammonia formed in the course of the reaction is advantageously removed from the reaction mixture using an inert gas, for example nitrogen. If the product crystallizes out on cooling to room temperature, the analytically pure polyurea can be isolated by repeated washing with ice-water and a little methanol.

The polyurea derivatives can also be used for the condensation in the form of 60–80% strength aqueous solutions, depending on chemical composition. A suitable way of enhancing the water solubility are reaction products with formaldehyde in which from 0.1 to 0.9 mol of formaldehyde is used per urea group for the hydroxyethylation of the urea derivatives. An adequate increase in the water solubility can be achieved even with from 0.1 to 0.3 mol of formaldehyde per urea group. The resulting colorless, aqueous, hydroxymethylated polyurea solutions have a very long storage life.

Preferred polyureas are:
dipropylenetrisurea

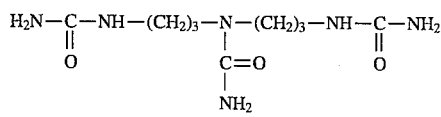

- hexamethylenediurea

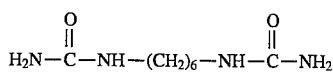

- 4,7-dioxadecane-1,10-diurea

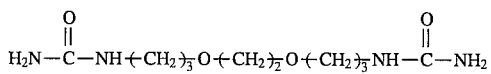

- diethylenetrisurea

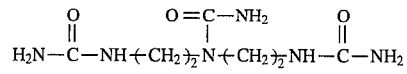

As component (C) the melamine resins of the invention optionally contain up to 10 mol %, preferably at least 0.1 mol %, of a phenol or of a mixture of phenols.

Suitable phenols (C) are phenols containing one or two hydroxyl groups such as phenols which are unsubstituted or substituted by radicals selected from the group consisting of $C_1$-$C_9$-alkyl and hydroxyl, $C_1$-$C_4$-alkanes substituted by two or three phenol groups, di(hydroxyphenyl) sulfones or mixtures of these phenols.

Preferred phenols are phenol, 4-methylphenol, 4-tert-butylphenol, 4-n-octylphenol, 4-n-nonylphenol, pyrocatechol, resorcinol, hydroquinone, 2,2-bis(4-hydroxyphenyl) propane and 4,4'-dihydroxydiphenyl sulfone. Particular preference is given to using phenol, resorcinol and/or 2,2-bis(4-hydroxyphenyl)propane.

The condensation products of the invention are obtainable by reacting the components (A), (B) and if desired (C) with formaldehyde or formaldehyde source compounds in a molar ratio of melamines to formaldehyde within the range from 1:1.15 to 1:4.5, preferably from 1:1.8 to 1:3.0.

Formaldehyde is generally used in the form of an aqueous solution having a concentration of for example from 40 to 50% by weight or in the form of compounds which in the reaction with (A), (B) and if desired (C) are a source of formaldehyde, for example in the form of oligomeric or polymeric formaldehyde in solid form such as paraformaldehyde, 1,3,5-trioxane or 1,3,5,7-tetroxocane.

For the production of fibers it is advantageous to use from 1 to 50, preferably from 5 to 15, in particular from 7 to 12, mol % of the substituted melamine and preferably from 0.1 to 9.5, particularly preferably from 1 to 5, mol % of one of the above-listed phenols or mixtures thereof.

For the production of foams it is advantageous to use from 0.5 to 20, preferably from 1 to 10, and in particular from 1.5 to 5, mol % of the substituted melamine or mixtures of substituted melamines and preferably from 0.1 to 5, particularly preferably from 1 to 3, mol % of one of the above-listed phenols or mixtures thereof.

To prepare the resins, melamine and substituted melamine (component A), polyureas (component B) and if desired phenols (component C) are polycondensed together with formaldehyde or formaldehyde source compounds. All the components can be present right from the beginning or they can be made to react portionwise and in succession and further amounts of these components may be added subsequently to the resulting precondensates.

The polycondensation is generally carried out in a conventional manner (see EP-A-355 760, Houben-Weyl, Vol. 14/2, 357).

The reaction temperatures are generally set within the range from 20° to 150° C., preferably within the range from 40° to 140° C.

The reaction pressure is generally not critical. The reaction is generally carried out within the range from 100 to 500 kPa, preferably within the range from 100 to 300 kPa.

The reaction can be carried out with or without solvent. Generally, if aqueous formaldehyde solution is used, no solvent is added. If formaldehyde bound in solid form is used, water is usually used as solvent, the amount used being generally within the range from 5 to 40, preferably from 15 to 25, % by weight, based on the total amount of components (A) to (C) used.

Furthermore, the polycondensation is generally carried out in a pH range: above 7. The pH range is preferably from 7.5 to 10.0, particularly preferably from 8 to 10.

Moreover, the reaction mixture may be treated with small amounts of customary additives such as alkali metal sulfites, e.g. sodium bisulfite and sodium sulfite, alkali metal formates, e.g. sodium formate, alkali metal citrates, e.g. sodium citrate, phosphates, polyphosphates, urea, dicyandiamide or cyanamide. They can be added before, during or after the condensation reaction as pure individual compounds or as mixtures with one another, in each case in substance or as aqueous solutions.

Other modifiers are amines and also amino alcohols such as diethylamine, ethanolamine, diethanolamine or 2-diethylaminoethanol.

Further suitable additives are fillers, emulsifiers or blowing agents.

As fillers it is possible to use for example fibrous or pulverulent inorganic reinforcing agents or fillers such as glass fibers, metal powders, metal salts or silicates, e.g. kaolin, talc, baryte, quartz or chalk, also pigments and dyes. As emulsifiers the rule is to use the customary nonionic, anionic or cationic organic compounds having long-chain alkyl radicals. If the uncured resins are to be made into foams, the blowing agent used can be for example pentane.

The polycondensation can be carried out batchwise or continuously, for example in an extruder (see EP-A 355 760), in a conventional manner.

The production of shaped articles by curing the condensation products of the invention is effected in a conventional manner by adding small amounts of acids such as formic acid, sulfuric acid or ammonium chloride.

Foams can be produced by expanding an aqueous solution or dispersion which contains the uncured condensate, an emulsifier, a blowing agent and a curing agent with or without customary additives as listed above and then curing the foam. Such a process is described in detail in DE-A-29 15 457.

Fibers are usually produced by spinning the melamine resin of the invention in a conventional manner for example following addition of a curing agent at room temperature in a rotospin machine and then curing the crude fibers in a heated atmosphere, or by spinning in a heated atmosphere to evaporate off the water serving as solvent and curing the condensate to completion. Such a process is described in detail in DE-A-23 64 091.

The foams and fibers obtained are characterized by improved resistance to hydrolysis and reduced formaldehyde emission.

EXAMPLES

The resin materials of the invention resulting from the respective condensation reactions were each admixed with 2% by weight (based on the total weight) of 35% strength by weight formic acid as curing agent and then forced at 30° C. through a rotospin apparatus having an orifice diameter of 500 μm. The crude fibers thus obtained were then heated at 230° C. for 1.5 h. This produced fibers having a diameter from 5 to 50 μm and a length from 1 to 20 cm.

The viscosity values reported in the examples were determined using a cone-plate viscometer (from Epprecht Instruments+Controls, gauge "D" cone) at a shear gradient of 20 $sec^{-1}$ and at 20° C.

Formaldehyde emission was measured using Test Method 112–1978 of the American Association of Textile Chemists and Colorists (AATCC).

In this test, an accurately weighed amount (about 1 g) of the product was arranged in a glass frit within a closed vessel containing 50 ml of water in such a way that the sample did not come into direct contact with the water. The test vessels were then heated at 49°±1° C. for 20 h. They were then each allowed to cool down to room temperature over about 90 min, the samples were removed from the vessels, and the respective sample vessel was shaken. Then 1 ml of each of the test solutions was admixed with 10 ml of an aqueous reagent solution containing 1.5 g of ammonium acetate, 0.03 ml of glacial acetic acid and 0.02 ml of acetylacetone and heated in a water bath at 58° C. for 7 min. The solutions obtained had a yellow coloration of an intensity varying with the formaldehyde content and whose absorbance values were measured after cooling (about 30 min) in a spectrophotometer at 412 nm.

Zero calibration of the photometer had previously been carried out using a blank sample (10 ml of reagent solution+1 ml of distilled water).

The formaldehyde content was determined by comparing the absorbance values thus obtained with the absorbance values of standard solutions containing a known amount of formaldehyde, the latter values having been determined by the same method and then plotted to form a calibration curve.

The resistance to hydrolysis was tested by refluxing in each case about 3 g of fibers for 24 h in 1 l of water. The fibers were then dried to constant weight at 90° C. in a drying cabinet.

EXAMPLE 1

Melamine Resin With 4,7-dioxadecane-1,10-diurea 1871 g (14.8 mol) of melamine, 432 g (1.48 mol) of 4,7-dioxadecane-1,10-diurea, 434 g of paraformaldehyde, 40.9 g of phenol and 8.25 ml of diethylaminoethanol were mixed with 1389 g of 40% strength by weight aqueous formaldehyde solution. The reaction mixture was then refluxed until it had a viscosity of 1300 Pa*sec. The values found for formaldehyde emission and loss of weight were as follows:

Formaldehyde emission: 330 ppm

Loss of weight by hydrolysis: 0% by weight

EXAMPLE 2

Melamine Resin With Dipropyleneurea 1871 g (14.8 mol) of melamine, 557.2 g (1.48 mol) of dipropylenetrisurea (methylolated with formaldehyde in a molar ratio of DPTH:Fo=1:0.5), 499.6 g of paraformaldehyde, 40.9 g of phenol, 24.75 ml of diethylaminoethanol and 1164.1 g of 40% strength by weight aqueous formaldehyde solution were mixed. The reaction mixture was then refluxed until it had a viscosity of 1300 Pa*sec. The values found for formaldehyde emission and loss of weight were as follows:

Formaldehyde emission: 300 ppm

Loss of weight by hydrolysis: 0–1% by weight

COMPARATIVE EXAMPLE 1 (See EP-A-523 485)

Melamine Resin Without Polyurea 1769 g (14.03 mol) of melamine and 618 g of an 80% strength by weight aqueous solution of an isomer mixture comprising 10% molar of 2-(5-hydroxy-3-oxapentylamino)-4,6-diamino-1,3,5-triazine, 50% molar of 2,4-di( 5-hydroxy-3-oxapentylamino)-6-amino-1,3,5-triazine, and 40%, molar of 2,4,6-tris(5-hydroxy-3-oxapentylamino)-1,3,5-triazine ("HOM") (1.50 mol) were mixed with 557.7 g of paraformaldehyde, 6.9 g of 2-diethylaminoethanol and 1063 g of 40% strength aqueous formaldehyde solution. The reaction mixture was then refluxed until it had a viscosity of 500 Pa*sec. The values obtained for formaldehyde emission and loss of weight were as follows:

Formaldehyde emission: 675 ppm

Loss of weight by hydrolysis: 14% by weight

COMPARATIVE EXAMPLE 1 (see EP-A-523 485)

Melamine Resin With 3 mol % of Phenol, No Polyurea 1791.7 g (14.22 mol) of melamine and 626.1 g of an 80% strength by weight aqueous solution of HOM (1.52 mol) and 44.6 g (0.47 mol) of phenol were mixed together with 557.9 g of paraformaldehyde, 7.0 g of 2-diethylaminoethanol and 1093.9 g of a 40% strength aqueous formaldehyde solution. The reaction mixture was then refluxed until it had a viscosity of 500 Pa*sec. The values obtained for formaldehyde emission and loss of weight were as follows:

Formaldehyde emission: 430 ppm

Loss of weight by hydrolysis: 10% by weight

We claim:

1. Water-insoluble condensation products, obtained by condensation of a mixture containing as essential components (A) from 80 to 99.9 mol %, based on the sum of (A), (B) and (C), of a mixture consisting essentially of
   (a) from 30 to 99 mol % of melamine and
   (b) from 1 to 70 mol % of a substituted melamine of the formula I

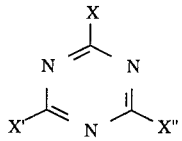

where X, X' and X" are each selected from the group consisting of —NH$_2$, —NHR and —NRR', and X, X' and X" are not all —NH$_2$ at one and the same time, and R and R' are each selected from the group consisting of hydroxy-C$_2$-C$_{10}$-alkyl, hydroxy-C$_2$-C$_4$-alkyl-(oxa-C$_2$-C$_4$-alkyl)$_n$, where n is from 1 to 5, and amino-C$_2$-C$_{12}$-alkyl, or mixtures of melamines I, (B) from 0.1 to 10 mol %, based on the sum of (A), (B) and (C) of a polyurea of the general formula II

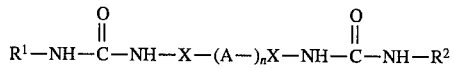

where 
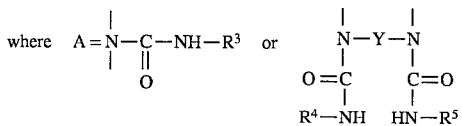

Y=C$_1$-C$_6$-alkylene, n=0 or 1,

X=C$_1$-C$_6$-alkylene,
   C$_5$-C$_6$-cycloalkylene,
   C$_1$-C$_6$-hydroxyalkylene or
   C$_4$-C$_{18}$-oxyalkylene, and R$^1$-R$^5$ are each H or CH$_2$OH and (C) up to 10 mol %, based on the sum of (A), (B) and (C), of phenols which are unsubstituted or substituted by radicals selected from the group consisting of C$_1$-C$_9$-alkyl and hydroxyl, C$_1$-C$_4$-alkanes substituted by two or three phenol groups, di(hydroxyphenyl) sulfones or mixtures of these phenols, with formaldehyde or formaldehyde source compounds in a molar ratio of melamines to formaldehyde within the range from 1:1.15 to 1:4.5.

2. Condensation products as defined in claim 1, wherein at least 0.1 mol % of component (C), based on the sum of (A), (B) and (C), is used.

3. Condensation products as defined in claim 1, wherein a completely or partially methylolated or unmethylolated polyurea selected from the group consisting of 4,7-dioxa-decane-1,10-diurea and dipropylenetrisurea is used.

4. Condensation products as defined in claim 1, wherein the substituted melamine used is a 2-hydroxyethylamino-1,3,5-triazine, a 2-hydroxyisopropylamino-1,3,5-triazine, a 5-hydroxy-3-oxapentylamino-1,3,5-triazine or a 6-amino-hexylamino-1,3,5-triazine.

5. Condensation products as defined in claim 1, wherein a phenol selected from the group consisting of phenol, 2,2-bis(4-hydroxyphenyl)propane and resorcinol is used.

6. A process for producing condensation products as defined in claim 1, which comprises condensing the components (A), (B) with formaldehyde or formaldehyde source compounds at from 20° to 150° C. and pressures from 100 to 500 kPa in a solvent or without a solvent.

7. A process for producing shaped articles, in particular fibers and foams, which comprises curing the condensation products as defined in claim 1 by adding small amounts of acids.

8. Shaped articles obtained from the process as defined in claim 7.

9. A process for producing condensation products as defined in claim 1, which comprises: condensing the components (A), (B) and (C) with formaldehyde or formaldehyde source compounds at from 20° to 150° C. and pressures from 100 to 500 kpa in a solvent or without a solvent, wherein at least 0.1 mol % of component (C) is used based on the sum of (A), (B) and (C).

* * * * *

UNITED STATES PATENT AND TRADEMARK OFFICE
CERTIFICATE OF CORRECTION

PATENT NO.: 5,530,031

DATED: June 25, 1996

INVENTOR(S): GUENTHER et al.

It is certified that error appears in the above-identified patent and that said Letters Patent is hereby corrected as shown below:

On the cover page, item [30], the foreign application priority data "43 30 910.0" should read --P 43 30 910.0--.

Column 7, claim 1, line 61, delete "general".

Column 8, claim 6, line 48, "150°C." should read --150°C--.

Column 8, claim 8, line 59, "150°C." should read --150°C--.

Column 8, claim 9, line 61, "kpa" should read --kPa--.

Signed and Sealed this

Twenty-fourth Day of September, 1996

Attest:

BRUCE LEHMAN

Attesting Officer          Commissioner of Patents and Trademarks